United States Patent [19]

Ferraro

[11] Patent Number: 4,530,508

[45] Date of Patent: Jul. 23, 1985

[54] JAW LOCKING MEANS FOR LATHE CHUCKS

[76] Inventor: Thomas A. Ferraro, 1582 Leon Dr., Hatfield, Pa. 19440

[21] Appl. No.: 398,106

[22] Filed: Jul. 14, 1982

[51] Int. Cl.³ .............................................. B23B 31/10
[52] U.S. Cl. ...................................... 279/123; 269/99; 279/1 ME; 279/110
[58] Field of Search .................... 279/123, 110, 1 ME; 269/49, 90, 99, 100, 203, 204, 205

[56] References Cited

U.S. PATENT DOCUMENTS

| | | | |
|---|---|---|---|
| 1,063,917 | 6/1913 | Gates | 279/123 |
| 2,401,971 | 6/1946 | Schuster | 279/123 |
| 2,687,308 | 8/1954 | Highberg et al. | 279/123 |
| 2,777,704 | 1/1957 | Sloan | 279/123 |

Primary Examiner—William R. Briggs
Assistant Examiner—Lawrence H. Meier
Attorney, Agent, or Firm—Molasky & Assocs.

[57] ABSTRACT

To firmly retain a jaw of a lathe or like chuck against movement it is formed with a transverse passageway or hole through it about midway of its length, a U-block is inserted in it in an inverted position so its legs will bear on the chuck face and a bolt is threaded in jaw directly above the U-block so it will bear on the block and force it against the chuck face.

8 Claims, 4 Drawing Figures

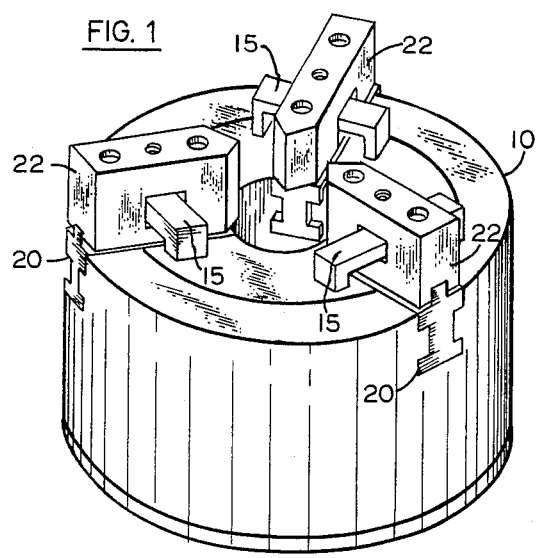
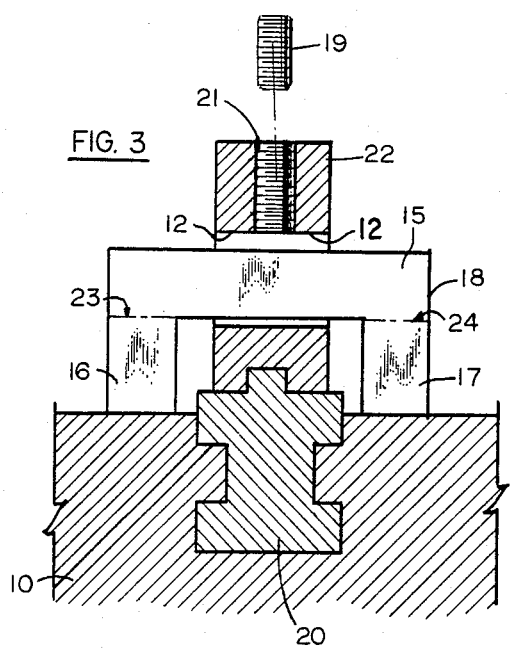
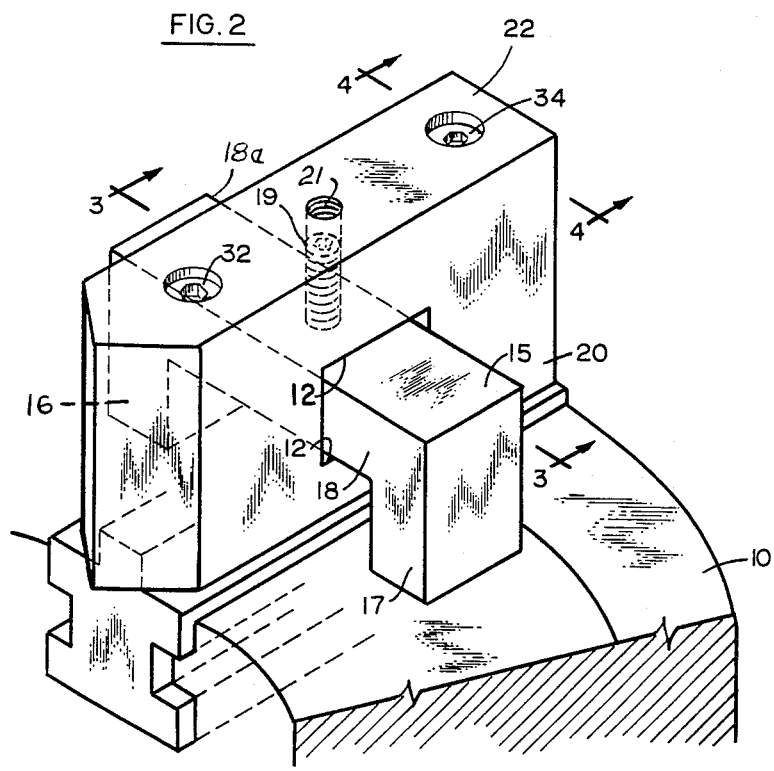
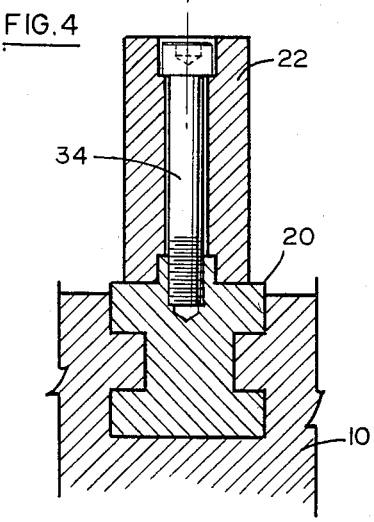

JAW LOCKING MEANS FOR LATHE CHUCKS

FIELD OF THE INVENTION

This invention relates to chucks for holding work pieces in lathes or like work piece rotating machines and particularly to means for rigidly holding the jaws against movement.

BACKGROUND OF THE INVENTION

To carry out the present day precision in lathe work it is essential that the jaw faces which bear against the work accurately define a circle which is in absolute axial alignment with the axis of the work piece. This can be achieved by individually adjusting the jaws radially back and forth until the work is positively positioned in its intended location, but this is a very time consuming and tedious task. The working time which is lost in such a procedure is totally inconsistent with high productivity.

Various short cuts have been devised to shorten the setup time to accurately position the work piece and one of these ways is to provide the jaws with so-called soft material which can relatively easily be machined. This soft material makes it possible to rotate the chuck on the lathe in a normal manner and machine the soft material to absolutely accurate concentricity to receive the work. However, even this has its limitations as the slight slack which exists between the operating parts of the chuck mechanism results in a more or less malpositioning of the jaws.

SUMMARY OF THE INVENTION

The present invention provides means for firmly holding the jaws in fixed positions relative to the chuck body so that its faces which are to receive and grip the work can be machined to the size which will accommodate the workpiece. Then when the work piece is placed between the jaws and the jaws are tightened against the work, the workpiece is accurately positioned axially and it can be machined with absolute precision.

The time required to bring the jaws to this accurate position is minute compared to the time required to individually adjust the jaws. Moreover, the use of the jaw locking means of this invention requires significantly less time and produces greater accuracy of positioning the jaw faces than the other means which have been devised. For example, the means of this invention is an improvement on the arrangement disclosed in U.S. Pat. No. 3,679,221 which issued to A.J. Behrens on July 25, 1972, to a much greater degree.

That patent shows an eccentric wheel 84 which is mounted on a transverse shaft 82 so that when the wheel is turned and wedged against the face of the chuck body the effect will be to wedge the jaw itself against motion. The structure of the patent has some utility but as the eccentric wheel has merely a camming action to hold the jaw in place, it is not fully satisfactory. The structure provided by the present invention is simple and inexpensive and serves to rigidly hold the jaws in position on the chuck body.

The invention can be applied to the jaws of the aforesaid patent to take the place of the wedge wheel and in order to show a representative application of the invention this description and drawings illustrate this use. This makes it unnecessary to illustrate the internal mechanisms of the chuck since the patent can be referred to for this disclosure. For this reason the structure and wording of the patent are hereby incorporated herein by this reference.

The patent shows a two piece jaw made up of a lower, master portion and a top portion but the invention may be applied to a jaw unit which is in one piece, i.e., the master and top portions are integral. The jaw to which the invention may be applied may therefore be a simple unit which has soft material at its work bearing face or the jaw may have the complexity of the mentioned patent. The internal jaw moving mechanism is also immaterial in the practice of this invention.

BRIEF DESCRIPTION OF THE DRAWINGS

The invention is illustrated in the accompanying drawings in which:

FIG. 1 is a perspective of a lathe chuck to which the structure of a preferred embodiment has been applied, FIG. 2 is a perspective on a larger scale of one of the jaws, FIG. 3 is a section on the line 3—3 of FIG. 2 and FIG. 4 is a section on the line 4—4 of FIG. 2.

BRIEF DESCRIPTION OF THE PREFERRED EMBODIMENTS

As stated above, the chuck 10 is basically the one of U.S. Pat. No. 3,679,221 and reference should be made to it for an understanding of the internal jaw operating mechanism. The master jaw 20 is the lower portion which fits in the chuck body in a dovetail-like relationship so that it can move only back and forth longitudinally in a radial direction. The top jaw 22 is the portion which is removably affixed to the master jaw 20 and it is made of soft steel material which is machineable. It is to be understood that the invention can be applied as well to the composite jaws of the aforesaid patent which has inserts 64 or like inserts. The threaded stud bolts 32 and 34 hold the master jaw 20 and the top jaw 22 firmly together.

A feature of the invention is the formation of the transverse passageway or hole which goes entirely through the top jaw 22. This hole is preferably broached so that it is rectangular in cross section and has a flat top surface which is parallel to the face of the chuck body. It is important that this passageway be located somewhat midway of the length of the jaw 22 and that it does not conflict with the studs 32 and 34.

A further feature of the invention is the provision of the U-block 15 which fits in the passageway 12 and extends beyond the sides of the jaw 22. This block 15 is in an inverted position so that its end legs 16 and 17 will extend down and bear on the face of the chuck body. The opposite sides 18 and 18a of the central part of block 15 should be parallel and fit snugly between the parallel side walls of the passageway 12. The U-block can consequently move up and down within the passageway without tilting sidewise.

To force the U-block 15 downwardly the invention provides the pusher bolt 19 which is screwed in the threaded bore 21 of the top jaw 22. This bore 21 is vertical to the face of the chuck body and enters into the passageway 12 centrally thereof; this means that when the bolt is screw in it will bear on the top of the U-block centrally of its top. The bolt 19 preferably has an Allen wrench socket in it and it lies below the top surface of jaw 22 so as to be out of the way.

The dimensions of the U-block fit the size of the jaw and the size and location of the passageway. The legs 16 and 17 should be long enough so there is clearance between the underside of the block and the bottom of the passageway. There must be a similar clearance between the top of the block and the ceiling of the passageway. This is shown in FIG. 3 which also shows that the bolt 19 bears on the top of the block at a mid point. As stated above, the block fits snugly between the side walls of the passageway.

This structure serves to directly push up the jaw 22 and rigidly hold it in place. There is no tendency to tilt the jaw at an angle as is true of the eccentric wheel which is shown in the U.S. Pat. No. 3,679,221, which puts pressure on one side only of the jaw. Instead of the wedging action of the patent, which can slip, the even-sided pressure exerted by the invention structure eliminates all chance of slippage.

Variations in the structure can be made. For instance the legs 16 and 17 can be separate pieces from the crosswise part of the block. This is indicated by the construction lines at 23 and 24 in FIG. 3. and this has the advantage that the machinist can have leg blocks of pairs of different heights to fit the particular situation. The U-block and the clamping bolt 19 can be sold with the jaw or as separate purchasable parts.

To use the structure of the invention, the jaws are brought to approximately the correct position for the machining operation, the U-block is inserted in place and the bolt 19 is screwed down firmly against it. This holds the jaw firmly in place for the cutting operation, after which the bolt 19 is released, the U-block is removed and the work piece is positioned in place. It is not essential, however, that the block 15 be removed as it may be allowed to remain loosely in place as it will not interfere with the normal operation of the jaws.

The figures show the size of the block, more or less, relative to the jaw and it will be appreciated that this may vary. If larger or smaller jaws are to have the invention applied to them the block 15 and the passageway 12 would be proportionately larger or smaller. The bolt 19 which serves as functional means to urge the jaw upwardly and the block 15 downwardly is to be proportionately sized.

I claim:

1. A jaw for use in a lathe chuck having a face and means for carrying the jaw relative to said face, said jaw having a transverse passageway and a ceiling which lies substantially parallel to the chuck face, an inverted U-block located in said passageway with its legs outside the jaw, and screw means associated with said jaw for urging the top of the U-block away from the ceiling of said passageway so that said legs can be brought to bear on the face of the chuck body thereby locking the jaw against movement.

2. The jaw of claim 1 in which the legs of the U-block are separate pieces.

3. The jaw of claim 1 in which the U-block is one piece.

4. The jaw of claim 1 in which the opposite sides of the U-block are parallel.

5. The jaw of claim 1 in which the screw means contacts substantially the center of the top of the U-block.

6. The jaw of claim 1 in which the screw means is a bolt which is threaded into the jaw.

7. The jaw of claim 1 in which the screw means is a bolt which is threaded into the jaw at a right angle to the U-block.

8. The jaw of claim 1 wherein said passageway is located approximately midway of the length of said jaw.

* * * * *